(12) United States Patent
Zhang et al.

(10) Patent No.: US 9,970,446 B1
(45) Date of Patent: May 15, 2018

(54) MULTI-FAN SPEED SINGLE-WIRE OUTPUT SYSTEM AND METHOD

(71) Applicant: ASIA VITAL COMPONENTS CO., LTD., New Taipei (TW)

(72) Inventors: Hu Zhang, New Taipei (TW); Dong-Qi Tian, New Taipei (TW); Wei-Ming Li, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days. days.

(21) Appl. No.: 15/352,583

(22) Filed: Nov. 16, 2016

(51) Int. Cl.
  *H02P 1/54* (2006.01)
  *H02P 1/30* (2006.01)
  *F04D 27/00* (2006.01)
  *H02P 5/50* (2016.01)

(52) U.S. Cl.
  CPC ......... *F04D 27/004* (2013.01); *F04D 27/001* (2013.01); *H02P 5/50* (2013.01)

(58) Field of Classification Search
  None
  See application file for complete search history.

(56) References Cited

U.S. PATENT DOCUMENTS

| | | |
|---|---|---|
| 7,095,188 B1 | 8/2006 | Lin |
| 2010/0215509 A1 | 8/2010 | Krishnamoorthy et al. |
| 2015/0032284 A1* | 1/2015 | Chen ...................... F04D 27/008 700/300 |
| 2015/0263652 A1* | 9/2015 | Sun .......................... H02P 5/50 318/503 |

* cited by examiner

*Primary Examiner* — Bentsu Ro
*Assistant Examiner* — Zemenay Truneh
(74) *Attorney, Agent, or Firm* — C. G. Mersereau; Nikolai & Mersereau, P.A.

(57) ABSTRACT

A multi-fan speed single-wire output system and a method thereof are disclosed. The system includes at least one first fan and one second fan, which have a first and a second rotation speed, respectively. The first fan transmits the first rotation speed to the second fan, and the second fan performs a logical operation on the first and the second rotation speed to generate an output rotation speed.

9 Claims, 4 Drawing Sheets

MULTI-FAN SPEED SINGLE-WIRE OUTPUT SYSTEM AND METHOD

FIELD OF THE INVENTION

The present invention relates to the field of fans, and more particularly to a multi-fan speed single-wire output system and a method thereof.

BACKGROUND OF THE INVENTION

Cooling fans are widely used in electronic devices to effectively dissipate heat sources in the electronic devices into ambient air outside the electronic devices, so that the electronic devices can maintain normal operation. In a conventional multi-fan speed output structure, the rotation speeds of all the fans are exactly output to a system end and the system end performs a logical operation on these fan speeds. Therefore, the system end has an increased operation load, which tends to cause delay in the operation of the whole system and increased heat production in the system. It is therefore desirable to work out a way to reduce the system's operation load and accordingly reduce the heat energy produced in the system.

SUMMARY OF THE INVENTION

To effectively solve the above problem, it is a primary object of the present invention to provide a system and a method capable of transmitting the rotation speeds of multiple fans to one of the fans for performing a logical operation on the rotation speeds to generate an output rotation speed.

Another object of the present invention is to provide a multi-fan speed single-wire output system and a method thereof, so that the operation status of multiple fans can be more easily monitored and controlled.

To achieve the above and other objects, the multi-fan speed single-wire output system provided according to the present invention includes a first fan having a first control element for receiving a first rotation speed of the first fan; and a second fan having a second control element for receiving a second rotation speed of the second fan. The first control element of the first fan is electrically connected to the second control element of the second fan and transmits the first rotation speed to the second control element; and the second control element generates an output rotation speed according to the first and the second rotation speed.

In an embodiment of the system according to the present invention, the first fan and the second fan are connected to a control end.

In an embodiment of the system according to the present invention, the control end is connected to the first and the second fan via a power cord, a ground line and a driving signal line.

In an embodiment of the system according to the present invention, the second control element of the second fan is electrically connected to a rotation speed monitoring end and transmits the output rotation speed to the rotation speed monitoring end.

In an embodiment of the system according to the present invention, the second control element selects one of the first and the second rotation speed to be the output rotation speed, depending on which one of the first and the second rotation speed is higher or lower than the other one.

In an embodiment of the system according to the present invention, the second control element generates the output rotation speed according to an average rotation speed of the first and second rotation speeds.

To achieve the above and other objects, the multi-fan speed single-wire output method provided according to the present invention includes the steps of driving a first fan and a second fan to rotate and accordingly generate a first rotation speed and a second rotation speed, respectively; transmitting the first rotation speed of the first fan to the second fan; and causing the second fan to perform a logical operation on the first rotation speed and the second rotation speed to generate an output rotation speed.

In an embodiment of the method according to the present invention, the second fan compares the first rotation speed with the second rotation speed to determine which one of the first and the second rotation speed is higher or lower than the other one, and generates the output rotation speed according to the higher or the lower rotation speed.

In an embodiment of the method according to the present invention, the second fan generates the output rotation speed according to an average rotation speed of the first and second rotation speeds.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and by referring to the accompanying drawings.

Figure 1:
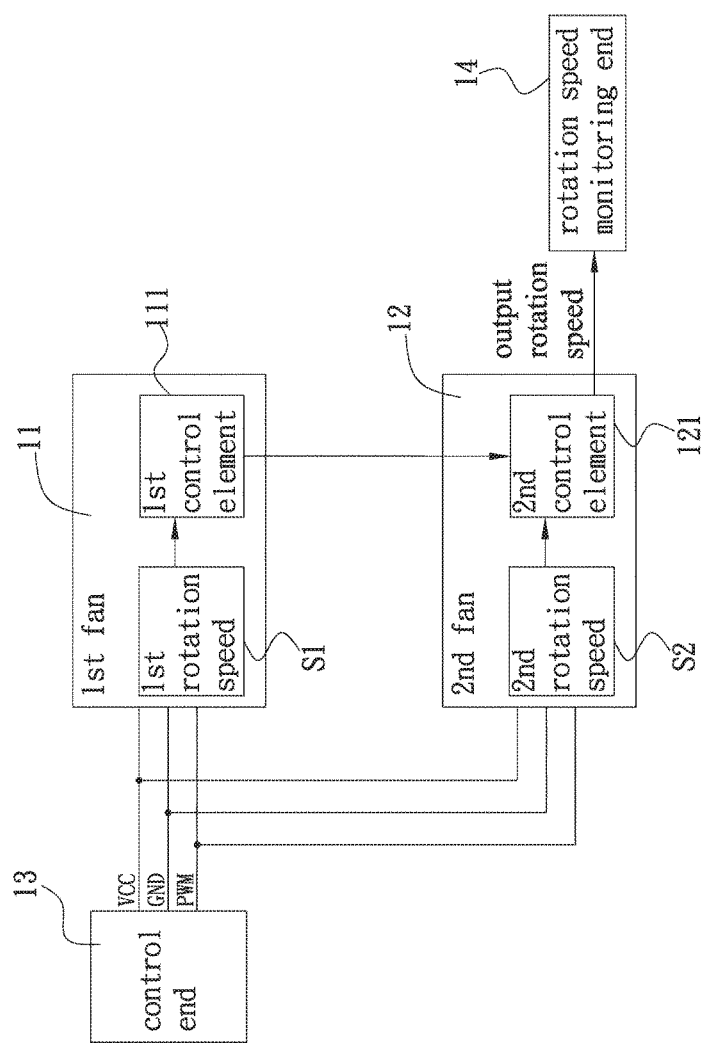
FIG. 1 is a block diagram of a multi-fan speed single-wire output system according to the present invention.

Please refer to FIG. 1 that is a block diagram of a multi-fan speed single-wire output system according to the present invention. As shown, the system includes a first fan 11 and a second fan 12, both of which are connected to a control end 13; and the second fan 12 is further connected to a rotation speed monitoring end 14. The control end 13 is connected to the first fan 11 and the second fan 12 via at least a power cord VCC, a ground line GND and a driving signal line PWM. Via the power cord VCC, the control end 13 supplies electric power to the first fan 11 and the second fan 12; and then, via the driving signal line PWM, the control end 13 drives the first fan 11 and the second fan 12 to rotate.

The first fan 11 has a first control element 111 and the second fan has a second control element 121; and the first control element 111 of the first fan 11 is electrically connected to the second control element 121 of the second fan 12. Means for connecting the first control element 111 to the second control element 121 can include, but not limited to, a universal asynchronous receiver/transmitter (UART), which is a communication interface. The first fan 11 and the second fan 12 rotate at a first rotation speed S1 and a second rotation speed S2, respectively. The first control element 111 of the first fan 11 receives and transmits the first rotation speed S1 to the second control element 121 of the second fan 12. The second control element 121 of the second fan 12 is connected to the rotation speed monitoring end 14 via a signal transmission line. In addition to the first rotation speed S1, the second control element 121 also receives the second rotation speed S2 of the second fan 12. On receipt of the first rotation speed S1 and the second rotation speed S2, the second control element 121 performs a logical operation based on the two rotation speeds and then generates an output rotation speed to the rotation speed monitoring end 14.

What is particularly noted is the second control element 121 of the second fan 12 selects either the first rotation speed S1 or the second rotation speed S2 to be the output rotation speed, depending on which one of the first and the second rotation speed S1, S2 is higher or lower than the other one and whether a higher rotation speed or a lower rotation speed is needed for use. Further, the second control element 121 can also generate the output rotation speed according to an average rotation speed of the first and second rotation speeds S1, S2.

Figure 2:
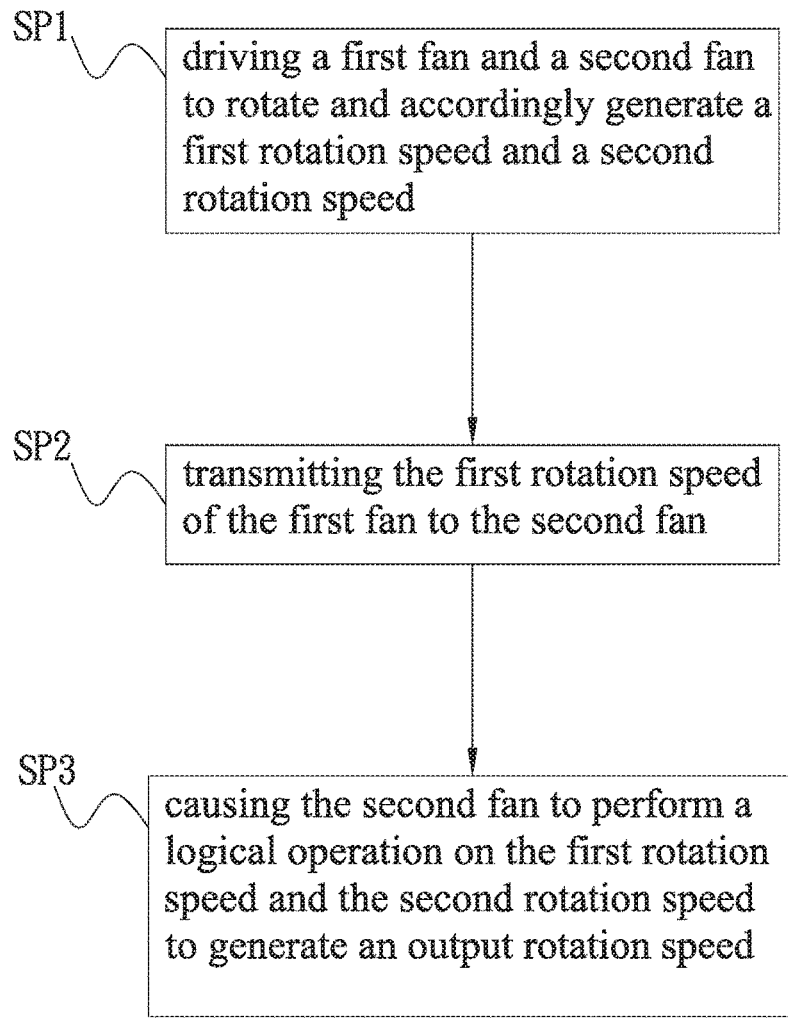
FIG. 2 is a flowchart showing the steps included in a multi-fan speed single-wire output method according to the present invention.

FIG. 2 is a flowchart showing the steps included in a multi-fan speed single-wire output method according to the present invention. Please refer to FIG. 2 along with FIG. 1. As shown, the method of the present invention includes the following steps:

Step SP1: Drive a first fan and a second fan to rotate and accordingly generate a first rotation speed and a second rotation speed, respectively. More specifically, as described above, a control end 13 supplies electric power to a first fan 11 and a second fan 12 and then outputs a driving signal to drive the first fan 11 and the second fan 12 to rotate. The first fan 11 and the second fan 12 respectively rotate at a first rotation speed S1 and a second rotation speed S2.

Step SP2: Transmit the first rotation speed to the second fan. More specifically, as described above, the first fan 11 has a first control element 111 and the second fan 12 has a second control element 121, and the first control element 111 of the first fan 11 is electrically connected to the second control element 121 of the second fan 12. The first control element 111 of the first fan 11 receives and transmits the first rotation speed S1 to the second control element 121 of the second fan 12.

Step SP3: The second fan performs a logical operation on the first rotation speed and the second rotation speed and generates an output rotation speed. More specifically, as describe above, the second control element 121 receives not only the first rotation speed S1, but also the second rotation speed S2. Then, the second control element 121 of the second fan 12 compares the first rotation speed S1 with the second rotation speed S2 to determine which one of them is higher or lower than the other one, and generates an output rotation speed according to the higher or the lower rotation speed. Then, the second control element 121 transmits the output rotation speed to a rotation speed monitoring end 14. Alternatively, the second control element 121 of the second fan 12 can generate the output rotation speed according to an average rotation speed of the first and second rotation speeds S1, S2 and then, transmits the output rotation speed to the rotation speed monitoring end 14.

The following is a description of the logical operation performed by the second control element 121.

Figure 3A:
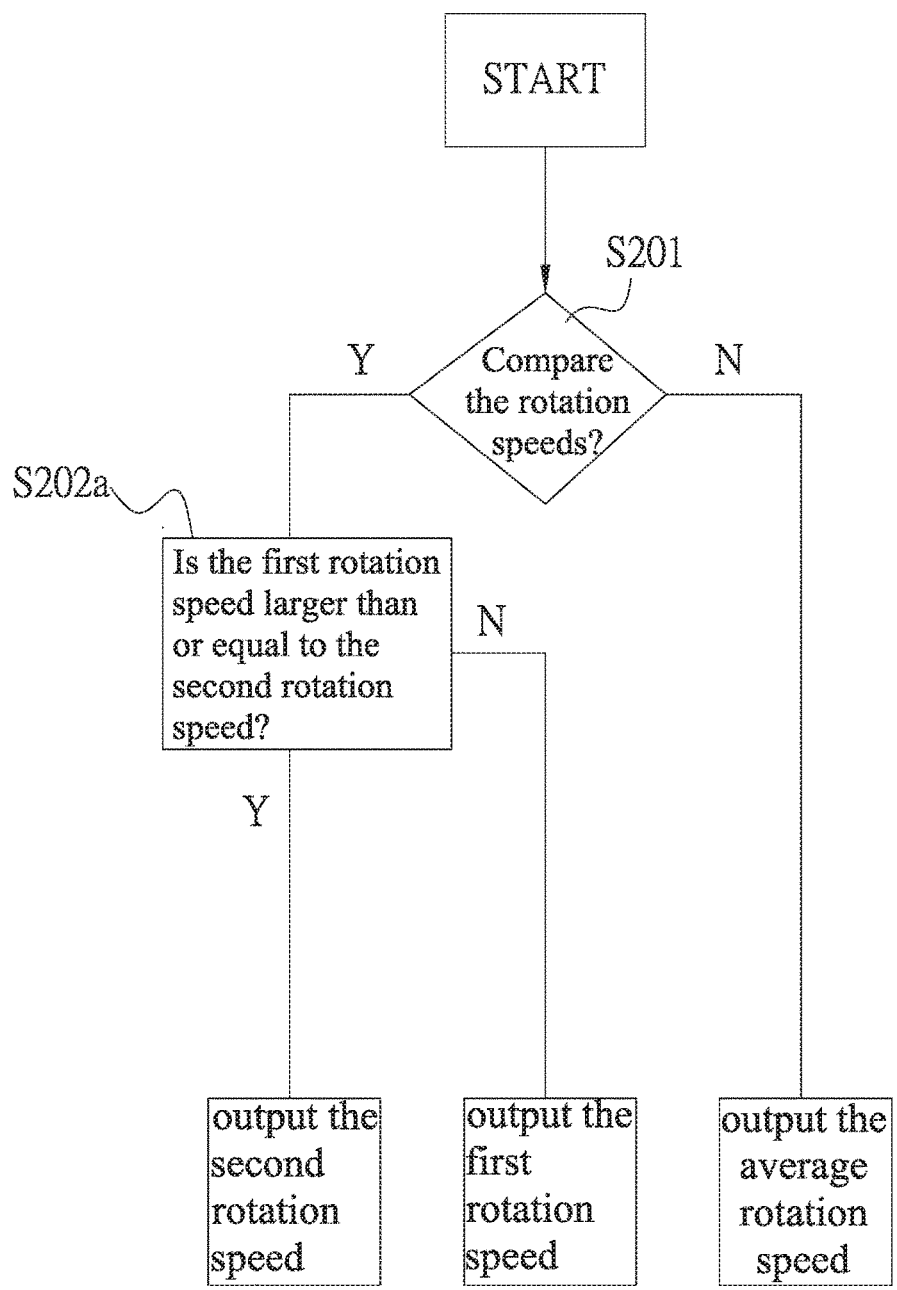
FIG. 3A is a flowchart showing a logical operation performed by a second control element to generate an output rotation speed that is a lower one or an average rotation speed of the rotation speeds of two fans.

Please refer to FIG. 3A, which is a flowchart showing the logical operation performed by the second control element 121 to generate an output rotation speed that is the lower one or an average rotation speed of the rotation speeds S1, S2 of the first and second fans 11, 12. As shown, when the second control element 121 has received the first rotation speed S1 and the second rotation speed S2, the step S201 of "Compare the rotation speeds?" is performed. If no, an average rotation speed of the first and second rotation speeds S1, S2 is output; or, if yes, go to the step S202a of "Is the first rotation speed larger than or equal to the second rotation speed?" If yes, the second control element 121 selects the lower second rotation speed S2 to be the output rotation speed; or, if no, the second control element 121 selects the lower first rotation speed S1 to be the output rotation speed.

Figure 3B:
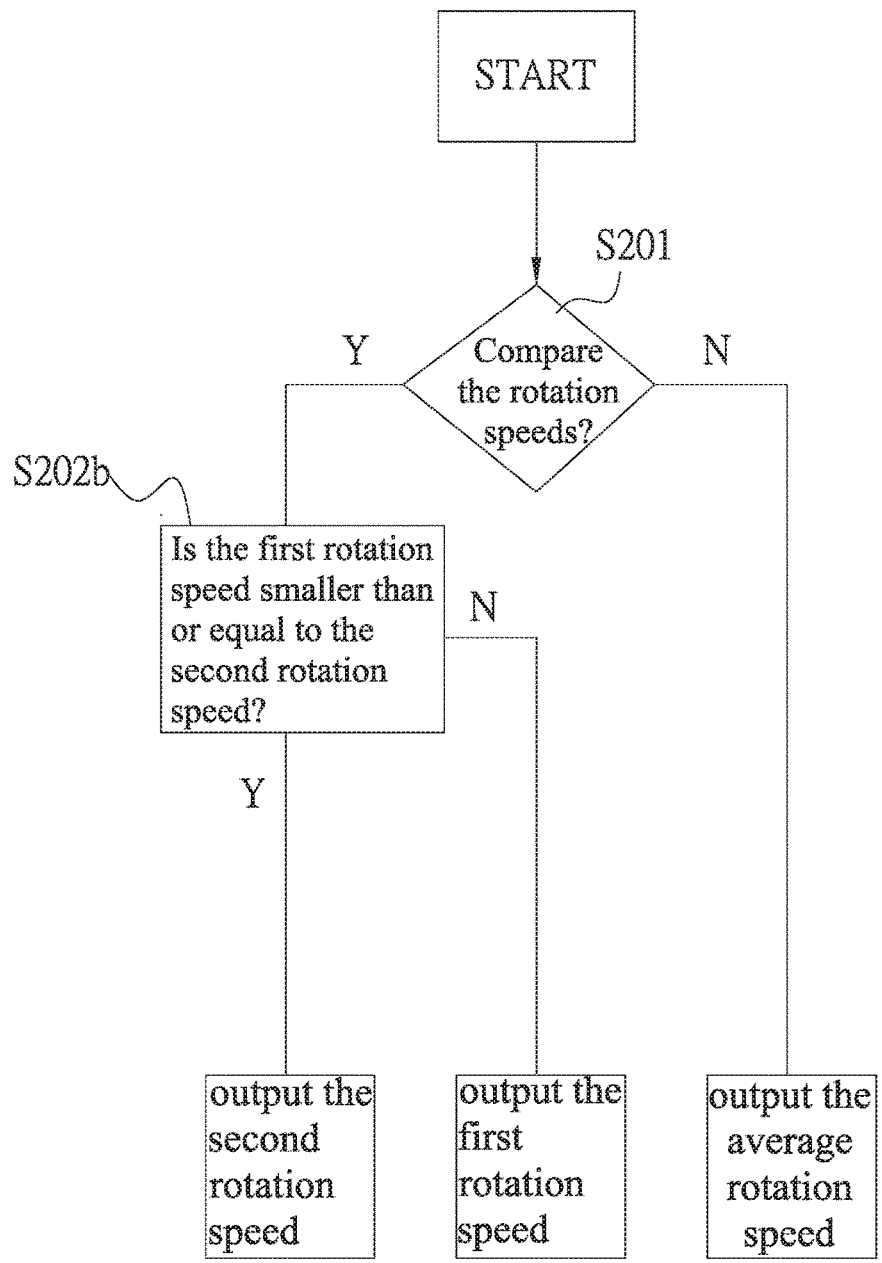
FIG. 3B is a flowchart showing a logical operation performed by a second control element to generate an output rotation speed that is a higher one or an average rotation speed of the rotation speeds of two fans.

In another embodiment as shown in FIG. 3B, which is a flowchart showing the logical operation performed by the second control element 121 to generate an output rotation speed that is the higher one or an average rotation speed of the rotation speeds S1, S2 of the first and second fans 11, 12. As shown, when the second control element 121 has received the first rotation speed S1 and the second rotation speed S2, the step S201 of "Compare the rotation speeds?" is performed. If no, an average rotation speed of the first and second rotation speeds S1, S2 is output; or, if yes, go to the step S202b of "Is the first rotation speed smaller than or equal to the second rotation speed?" If yes, the second control element 121 selects the higher second rotation speed S2 to be the output rotation speed; or, if no, the second control element 121 selects the higher first rotation speed S1 to be the output rotation speed.

With the above system and method, the first rotation speed S1 of the first fan 11 is transmitted to the second fan 12 instead of the rotation speed monitoring end 14. Then, the second control element 121 of the second fan 12 receives the first and the second rotation speed S1, S2 and performs a logical operation to generate an output rotation speed to the rotation speed monitoring end 14. By outputting the rotation speed via single wire, the operational status of multiple fans can be more easily monitored and controlled.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A multi-fan speed single-wire output system, comprising:
    a first fan including a first control element for receiving a first rotation speed of the first fan; and
    a second fan including a second control element for receiving a second rotation speed of the second fan;
    the first control element of the first fan being electrically connected to the second control element of the second fan and transmitting the first rotation speed to the second control element; and the second control element generating an output rotation speed according to the first and the second rotation speed; and
    wherein the transmission of rotation speed is only from the first control element to the second control element.

2. The multi-fan speed single-wire output system as claimed in claim 1, wherein the first fan and the second fan are connected to a control end.

3. The multi-fan speed single-wire output system as claimed in claim 2, wherein the control end is connected to the first and the second fan via a power cord, a ground line and a driving signal line.

4. The multi-fan speed single-wire output system as claimed in claim 1, wherein the second control element of the second fan is electrically connected to a rotation speed monitoring end and transmits the output rotation speed to the rotation speed monitoring end.

5. The multi-fan speed single-wire output system as claimed in claim 1, wherein the second control element selects one of the first and the second rotation speed to be the output rotation speed, depending on which one of the first and the second rotation speed is higher or lower than the other one.

6. The multi-fan speed single-wire output system as claimed in claim 1, wherein the second control element generates the output rotation speed according to an average rotation speed of the first and second rotation speeds.

7. A multi-fan speed single-wire output method, comprising the following steps:
driving a first fan including a first control element and a second fan including a second control element to rotate and accordingly generate a first rotation speed and a second rotation speed, respectively;
transmitting the first rotation speed of the first fan to the second fan;
causing the second fan to perform a logical operation on the first rotation speed and the second rotation speed to generate an output rotation speed; and
wherein the transmission of rotation speed is only from the first control element to the second control element.

8. The multi-fan speed single-wire output method as claimed in claim 7, wherein in the logical operation step, the second fan compares the first rotation speed with the second rotation speed to determine which one of the first and the second rotation speed is higher or lower than the other one, and generates the output rotation speed according to the higher or the lower rotation speed.

9. The multi-fan speed single-wire output method as claimed in claim 7, wherein the second fan generates the output rotation speed according to an average rotation speed of the first and second rotation speeds.

* * * * *